United States Patent [19]

Schirmann et al.

[11] Patent Number: 4,725,421

[45] Date of Patent: Feb. 16, 1988

[54] PROCESS FOR THE PREPARATION OF CONCENTRATED SOLUTIONS OF HYDRAZINE HYDRATE

[75] Inventors: Jean P. Schirmann, Oullins; Jean Combroux, Mornant; Serge Y. Delavarenne, Francheville Le Haut, all of France

[73] Assignee: Atochem, Paris, France

[21] Appl. No.: 759,341

[22] Filed: Jul. 26, 1985

Related U.S. Application Data

[63] Continuation of Ser. No. 375,780, May 6, 1982, abandoned, which is a continuation of Ser. No. 290,028, Aug. 5, 1981, abandoned, which is a continuation-in-part of Ser. No. 182,368, Aug. 29, 1980, abandoned, which is a continuation of Ser. No. 721,608, Sep. 8, 1976, abandoned.

[30] Foreign Application Priority Data

Sep. 10, 1975 [FR] France ............................. 75 27699

[51] Int. Cl.$^4$ .......................................... C01B 21/16
[52] U.S. Cl. ..................................... 423/407; 568/383
[58] Field of Search ......................... 423/407; 568/383

[56] References Cited

U.S. PATENT DOCUMENTS

| | | |
|---|---|---|
| 3,607,041 | 9/1971 | Ellis et al. ............................ 423/407 |
| 3,869,541 | 3/1975 | Weiss .................................. 423/407 |

FOREIGN PATENT DOCUMENTS

| | | | |
|---|---|---|---|
| 626885 | 9/1961 | Canada ................................ 423/407 |
| 952282 | 3/1964 | United Kingdom ................ 423/407 |
| 1164460 | 9/1969 | United Kingdom ................ 423/407 |

Primary Examiner—John Doll
Assistant Examiner—Wayne A. Langel
Attorney, Agent, or Firm—Burns, Doane, Swecker & Mathis

[57] ABSTRACT

A continuous method for the preparation of concentrated aqueous solutions of hydrazine hydrate from ketazines which are slightly soluble in water, by hydrolysis and distillation under pressure using a distillation column. The column is fed with the ketazine or ketazines and water wherein the water/azine molar ratio ranges between 5 and 7.75.

20 Claims, No Drawings

PROCESS FOR THE PREPARATION OF CONCENTRATED SOLUTIONS OF HYDRAZINE HYDRATE

This application is a continuation of application Ser. No. 375,780, filed May 6, 1982, which is a continuation of Ser. No. 290,028, filed Aug. 5, 1981, which is a continuation-in-part of Ser. No. 182,368, filed Aug. 29, 1980, which is a continuation of Ser. No. 721,608, filed Sept. 8, 1976, all now abandoned.

The present invention relates to a method for obtaining concentrated aqueous solutions of hydrazine hydrate by the quantitative hydrolysis reaction of a ketazine or mixture of ketazines which are slightly soluble in water.

According to the prior art, preparation of hydrazine by means of the Raschig method is well known. However, yields scarcely exceed 60% and the solutions obtained contain only 1 to 2% by weight of hydrazine hydrate and about 4% of sodium chloride. value of this prior known method. In order to obtain commercially useful concentrated solutions, procedures are necessary for the concentration of these dilute solutions and for separation of the salt. However, these are expensive operations which detract considerably from the economic In other known methods for the synthesis of hydrazine, oxidation of ammonia is carried out in the presence of a ketone and leads to ketazines in yields which are high in proportion to the oxidizing agent used. The latter may be sodium hypochlorite, hydrogen peroxide or peroxy compounds therefrom. The ketazines, in the case of acetone azine and methylethylketone azine, for example, form azeotropic mixtures with water, the boiling point of which is less than that of water and this enables cheaper separation and concentration of the hydrazine. These operations are even simpler in the case of methylethylketone or methylisobutylketone because the low solubility of the corresponding azines in water permits direct separation.

Both of the above processes are taught as prior art in, for example, Kohnen et al. U.S. Pat. No. 4,189,411

In an article by E. C. Gilbert, *Journal of the American Chemical Society*, Vol. 51, Pages 3394–3409 (1929), the author presents the results of studies of the equilibrium of formation and hydrolysis of azines in aqueous solution and has calculated the thermodynamic parameters of the system. The hydrolysis reaction action is endothermic and, thus, Le Chatelier's principle indicates that said reaction is favored by an elevation of temperature. Dr. Gilbert verifies this on page 3408 where he states "A rise in temperature will therefore shift the whole equilibrium markedly to the right favoring the hydrolysis." Under these conditions, and taking into account the boiling points of lower ketones (such as acetone, methylethylketone, etc.) it is apparent to the art that in order to increase the temperature so as to favor hydrolysis, it is necessary to operate under pressure. Thus, obtaining hydrazine hydrate from a ketazine requires a hydrolysis which in general is carried out at high temperature and thus under pressure.

The balanced reaction of hydrolysis of azines by $H_2O$ at elevated temperature and under pressure is therefore in the public domain since 1929. This is a well known technique shown by the following equation:

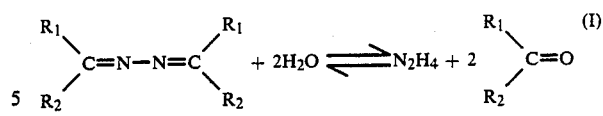

From the kinetic and thermodynamic study of this equilibrium made in the Gilbert article, it is brought out clearly (pages 3404 and 3408) that a raising of the temperature favors movement of theis equilibrium to the right and therefore favors hydrolysis. It is known to the art that one means for moving an equilibrium consists in eliminating from the medium one of the participants of the equilibrium, for example, ketone. It is also known to the art that it is possible to shift the equilibrium by increasing the concentration of one of the reagents, for example, water. Thus, the simultaneous use of these three means is known to the art.

In French patent No. 1,315,348 which corresponds to British patent No. 952,282 and Kohnen et al., U.S. Pat. No. 3,189,411 and in French patent No. 1,506,943 which corresponds to British patent No. 1,174,050, there are described methods for the hydrolysis of aqueous solutions of azines and/or corresponding hydrazones, which consist of distilling these azine solutions continuously in a column at a pressure of 1 to 50 bars, at a temperature ranging from 100° C. to 250° C. at the base of the column. At the head of the column, the liberated ketone is distilled off, whereas at the base an aqueous solution of hydrazine hydrate is collected. However, in these prior known methods, the concentration of the aqueous solution of hydrazine hydrate that is obtained is relatively low, generally less than 15% and more often of the order of 10%. The afore-mentioned French patent No. 1,315,348 and its British and U.S. patent equivalents present the first experimental description known to the present inventors of hydrolysis of a ketazine at high temperature and, hence, under pressure. However, the specification, examples and claims of the patent are limited specifically to the hydrolysis of aqueous solutions of dimethyl ketazine and/or acetone hydrazone. Indeed, in French patent No. 1,506,943 which corresponds to British patent No. 1,174,050 it is stipulated that the ketones which can be used for the hydrolysis procedure must be soluble or emulsifiable in water in the form of their ketazines. This had lead one skilled in the art to believe that the patentee considered it impossible to carry out the hydrolysis of a two-phase system.

British patent No. 1,211,547 which corresponds to Ellis et al., U.S. Pat. No. 3,607,041 confirmed it was surprising that a two-phase system for the hydrolysis of ketazines miscible with water only to a limited extent could be handled. These patents describe a method which consists of injecting the azine and the water separately into a distillation column in a ratio by weight of from 1 to 4 at a pressure of from 2 to 25 bars and with a base temperature ranging between 150° C. and 200° C. Taking into consideration the existence of two immiscible phases in the column, this method necessitates using a special distillation column in order to obtain a high rate of hydrolysis. For example, at the injection level the column must have a number of trays provided with relatively high weirs in order to ensure a relatively long residence time of the reactants in the hydrolyzing zone. Nevertheless in practice, the concentration of the hydrazine hydrate solutions obtained by this method is not higher than for the other prior art methods described above.

In Otsuka et al. U.S. Pat. No. 3,481,701 the patentees call attention to the fact that it is a well known principle that hydrazine hydrate can be made from ketazines under 5-10 atmospheres pressure by means of hydrolysis and that it requires a temperature of 130°-180° C. The patentees assert, however, that said known process had the following three defects:

1. The high temperature causes the hydrazine hydrate to decompose.
2. It requires a high pressure generating apparatus.
3. As the hydrolysis of ketazine evolves a great volume of vapor, the thermal efficiency is impaired.

All of the examples disclosed in prior art known to the present inventors in the area of hydrolysis under pressure use a water-azine molar ratio greater than 8.3, and in the vicinity of 20 as a general rule. On the other hand, Canadian patent No. 626,885 which corresponds to Rahlfs, U.S. Pat. No. 3,028,219 is not in the field of hydrolysis under pressure. Furthermore, this patent is not directed to the production of hydrazine hydrate but rather to the removal of acetone from aqueous hydrazine solutions containing the same. Only a part of the acetone is separated and both the sump discharge and distillate contain greater amounts of acetone than hydrazine hydrate. Thus, considering all of the prior art teachings, there was no reason for one skilled in the art to attempt to use lower molar ratios in hydrolysis under pressure.

Moreover, in all of the prior art known to the present inventors in the area of hydrolysis under pressure, the concentration of hydrazine hydrate resulting from the hydrolysis of a ketazine never exceeds 20% and in general, where quantitative hydrolyses are concerned, it is about 10%. However, the strengths of industrial, commercial solutions are most frequently 24%, 35%, 80% and even 100% hydrazine hydrate. Thus, there has been a continued effort in the art to develop an advantageous process for obtaining concentrated solutions of hydrazine hydrate directly.

The present invention provides a method whereby disadvantages of prior known methods may be overcome and whereby the above object has been accomplished.

The novel method which is the feature of the present invention unexpectedly enables a substantially quantitative hydrolysis to be achieved, even though using a proportion of water substantially lower than according to the teachings of the prior art, and even though a fractionating column of the conventional type is employed. The present invention further permits obtaining a stable solution of hydrazine hydrate which is substantially more concentrated than that obtained using prior methods. The solutions obtained by using the method of the present invention are directly usable commercially, and are of a concentration of at least 30% by weight and in general exceeding 45% by weight. Furthermore, the solutions obtained according to the method of the present invention are substantially free of by-products and represent a substantially quantitative yield of hydrazine. Also the consumption of energy referred to the unit weight of hydrazine hydrate obtained according to the method, is particularly low.

In further detail, the present invention relates to a continuous method for the preparation of concentrated aqueous solutions of hydrazine hydrate from a ketazine or mixture of ketazines which are slightly soluble in water. The process involves hydrolysis and distillation under pressure using a distillation column and operating by withdrawal of the ketone or ketones at the head of the column and hydrazine hydrate at the base. The column is fed with the ketazine or ketazines and water in a water/azine molar ratio ranging between 5 and 7.75; that is, at least equal to 5 and not exceeding 7.75.

In accordance with the present invention, a temperature maintained at the base of the distillation column ranging between 150° C. and 200° C. and more preferably between 175° C. and 190° C. Pressure is maintained in the column corresponding to the boiling point of the ketazine/water mixture defined above. This pressure generally ranges between 2 and 15 bars, more preferably between 7 and 12 bars.

The present invention permits any fractionating column of a conventional type to be employed; that is to say, a tray column or a packed column of simple construction. More particularly, columns of constant diameter and number of theoretical plates per unit height of column are useful. The column is preferably fed at its middle section. It is desirable to introduce the azine and the water separately in the middle section of the column, the water being preferably injected beneath the level of the feed of azine. At the top or head of the distillation column, the ketone-water azeotrope is collected and it separates rapidly due to the low miscibility of the components. The recovery level is close into 100%. It is desirable to recycle this separated water directly into the column at the level of the main feed.

Operation of the distillation column is effected with a low reflux ratio, generally ranging between 0.1 and 5 and more preferably between 1 and 4. This feature of the invention, in addition to the fact that minimum amounts of water are used, represents an important advantage from the standpoint of economics.

For the purposes of the method of this invention, the slightly soluble ketazines are ketone azines having 4 to 8 carbon atoms, and more particularly, methylethylketone azine and methylisobutylketone azine which are sparingly soluble in water.

The following examples in which the parts and percentages are expressed by weight, illustrate the present invention.

EXAMPLE 1

Into a distillation column having a height of 2.5 m and diameter of 20 mm, packed with Raschig rings, 28 g/h of methyl ethylketone azine (0.2 mole) and 25.2 g/h of water (1.4 mole) are fed continuously. The column is maintained at a pressure of 8 bars and operates at a reflux ratio of 0.5. A temperature of 150° C.-151° C. is established at the head whereas the evaporator of the column is at 180° C.

From the foot of the column, there is extracted continuously 20.5 g/h of an aqueous solution of hydrazine hydrate containing 9.95 g of hydrazine hydrate (0.199 mole), 10.55 g of water (0.51 mole) and traces of carbonyl compounds, which corresponds ponds to a hydrazine hydrate content of 48.5%.

At the head of the column 28.7 g/h of methylethylketone (0.39 mole) and 4 g/h of water (0.22 mole) are colledted.

EXAMPLE 2

In the boiler of a stainless steel column having a diameter of 20 mm and a height of 250 mm filled with glass Raschig rings having a diameter of 6 mm, 140 g of a hydrazine hydrate solution titrating 36% by weight are introduced and brought to the boil under a pressure of 9 bars (absolute bars). Then 31.2 g/h of an azine solution from methylethylketone titrating for 89.7% azine and 7% methylethylketone, as well as 24.5 g/h water, are continuously introduced. A temperature of 150° C. is maintained at the head of the column, and the reflux ratio is adjusted to a value of 2.

From the boiler 22 g/h of a hydrazine hydrate solution titrating 44.7% by weight of hydrazine hydrate are continuously removed. At the top of the column 32.6% g/h of an aqueous solution of methylethylketone titrating for 88% by weight is collected.

What is claimed is:

1. A continuous process for the preparation of an at least 30% concentrated aqueous solution of hydrazine hydrate, comprising (i) continuously, substantially quantitatively hydrolyzing a slightly water-soluble ketazine in an aqueous reaction medium, the molar ratio of the amount of water which comprises said aqueous reaction medium to said ketazine ranging from 5 to 7.75, (ii) continuously, concomitantly distilling from said reaction medium a distillate fraction which consists essentially of ketone liberated from said ketazine and a minor amount of water, said steps (i) and (ii) being carried out at elevated temperature and under superatmospheric pressure, and (iii) continuously withdrawing from said reaction medium a base fraction consisting essentially of a stable, at least 30% concentrated solution of essentially pure hydrazine hydrate in water.

2. The process as defined by claim 1, said steps (i) and (ii) comprising continuously supplying a feed consisting essentially of water and ketazine to an hydrolysis/distillation reaction zone in a water/ketazine molar ratio ranging from 5 to 7.75.

3. The process as defined by claim 2, said hydrolysis/distillation reaction zone comprising a fractionating column.

4. The process as defined by claim 3, said hydrolysis/distillation reaction zone comprising a single, tray or packed fractionating column.

5. The process as defined by claim 4, said fractionating column having constant diameter and number of theoretical plates per unit height thereof.

6. The process as defined by claim 3, said steps (i) and (ii) comprising continuously, separately supplying water and ketazine feedstreams to said fractionating column.

7. The process as defined by claim 6, comprising supplying said separate water and ketazine feedstreams to the middle section of said fractionating column.

8. The process as defined by claim 7, comprising supplying said separate water feedstream to said fractionating column at a point above the supply level of said separate ketazine feedstream.

9. The process as defined by claim 3, comprising distilling (ii) at a reflux ratio ranging from 0.1 to 5.

10. The process as defined by claim 3, comprising distilling (ii) at a reflux ratio ranging from 1 to 4.

11. The process as defined by claim 1, said steps (i) and (ii) being carried out under a pressure ranging from 2 to 15 bars.

12. The process as defined by claim 1, said steps (i) and (ii) being carried out under a pressure ranging from 7 to 12 bars.

13. The process as defined by claim 3, said steps (i) and (ii) being carried out under a pressure ranging from 2 to 15 bars, and the temperature at the base of said fractionating column ranging from 150° C. to 200° C.

14. The process as defined by claim 3, said steps (i) and (ii) being carried out under a pressure ranging from 2 to 15 bars, and the temperature at the base of said fractionating column ranging from 175° C. to 190° C.

15. The process as defined by claim 1, said slightly water-soluble ketazine comprising methylethylketone azine or methylisobutylketone azine.

16. The process as defined by claim 1, said aqueous reaction medium comprising an aqueous solution of hydrazine hydrate.

17. The process as defined by claim 6, said steps (i) and (ii) comprising continuously separately supplying water and ketazine feedstreams to said fractionating column, and wherein said fractionating column a separate aqueous solution of hydrazine hydrate is under boil.

18. The process as defined by claim 1, comprising (iii) continuously withdrawing from said reaction medium a base fraction consisting essentially of a stable, at least 45% concentrated solution of essentially pure hydrazine hydrate in water.

19. The process as defined by claim 1, said distillate comprising a ketone/water azeotrope.

20. The process as defined by claim 19, further comprising recycling water of distillation to said aqueous reaction medium.

* * * * *